Feb. 6, 1940.                J. A. WALLER                2,189,354
                            CULINARY DEVICE
                          Filed June 17, 1938
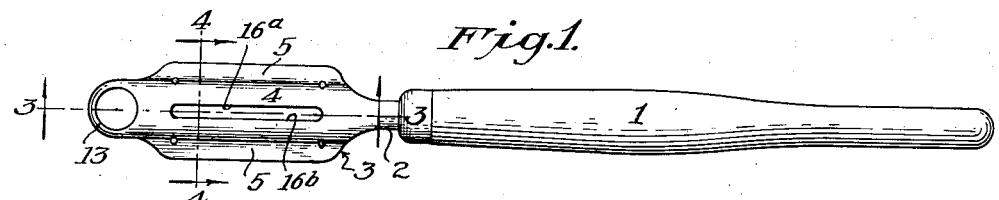
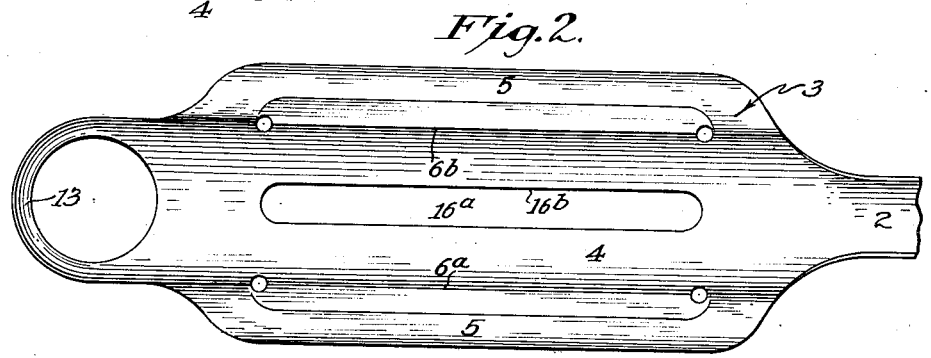
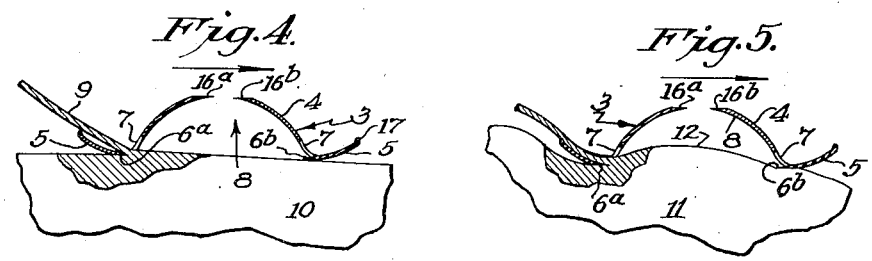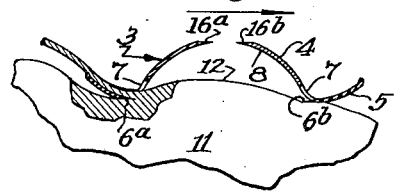
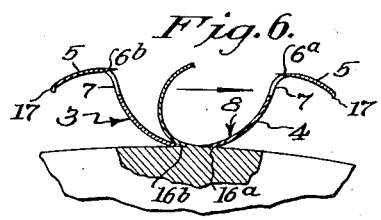
INVENTOR.
JOHN A. WALLER,
BY
                    ATTORNEYS.

Patented Feb. 6, 1940

2,189,354

UNITED STATES PATENT OFFICE 2,189,354

CULINARY DEVICE

John A. Waller, Beverly Hills, Calif.

Application June 17, 1938, Serial No. 214,223

1 Claim. (Cl. 30—279)

This invention relates to culinary devices, and pertains particularly to a peeler device adapted for manual use in the peeling of fruits or vegetables, and the principal object of the invention is to provide a device of the character described which is of simple and inexpensive construction, and adapted for use by either a right- or left-handed person.

A further object of the invention is to provide a peeler device provided with cooperating cutter blade members adapted to act either as cutting elements or guide elements, the one blade member serving as a guide for the other blade member when the latter is serving as a cutting element in one direction of motion of the device, and the other blade member serving as a guide for the one blade member in the other direction of motion of the device.

A further object of the invention is to provide a peeler device provided with opposed blade elements disposed transverse to the direction of cutting movement of the device and each adapted to serve respectively as guide elements and cutting elements, said opposed blade elements being spaced from one another in said direction of movement and said device being recessed away from the cutting portions of said blade elements at the position of the space therebetween.

A further object of the invention is to provide a peeler device having two opposed blade elements having cutting blades disposed in a common plane and adapted for simultaneous sharpening by application of a sharpening tool flush upon the two blade elements.

A further object of the invention is to provide a culinary device adapted for peeling vegetables, fruits, and the like, which is equally effective in its peeling action upon curved and substantially straight surfaces.

The culinary device of the present invention comprises, essentially, a handle member carrying a cutter element formed of a single piece of metal and provided with two laterally spaced opposed cutting blade members arranged on a common plane, said blade members extending substantially parallel to the length of the handle member, and the body portion of the cutter element being preferably recessed away from the plane of said blade members at the position of the space between said blade members.

Other objects and features of the invention will be brought out in the ensuing description of a preferred embodiment thereof, as exemplified in the accompanying drawing, or will be apparent therefrom.

Referring to the drawing:

Fig. 1 is a plan view of the complete device;

Fig. 2 is an inverted plan view of the cutter element portion thereof, on enlarged scale;

Fig. 3 is a longitudinal section thereof, taken on line 3—3 of Fig. 1;

Fig. 4 is a transverse section taken on line 4—4 in Fig. 1, showing the device in use to peel along a substantially straight surface;

Fig. 5 is a view corresponding to Fig. 4, showing the device in use to peel along a curved surface; and Fig. 6 is a view corresponding to Figs. 4 and 5, showing the device used in inverted position, employing a pair of auxiliary cutter members to remove a particularly thin peeling from an object.

Referring to the drawing, the device may comprise a handle member 1 provided with an opening at one end adapted to receive the shank portion 2 of the cutter element 3. The cutter element 3 may be formed as a stamping, from a single piece of metal such as stainless steel or the like, and comprises a substantially channel-shaped, preferably semi-cylindrical, body portion 4 provided with outwardly flanged portions 5 extending lengthwise of said body portion at the edge portions of the channel cross-section, each carrying an inwardly directed cutting blade, as at 6a and 6b, said cutting blades 6a and 6b being disposed substantially upon a common plane. The blades 6a and 6b are conveniently formed by slotting the body portion 4 as at 7 (Figs. 3–6) and bending the adjacent portion of the flange portions 5 downwardly into substantial alinement with each other. The semi-cylindrical shape of the body portion 4 forms a recess 8 intermediate the opposed blades, said recess extending substantially the full length of the cutter element 3 at the position of the space between the opposed blades 6a and 6b.

As shown in Fig. 4, the device may be employed to remove the peeling from a substantially flat or straight surface by laying the device flat upon the surface and drawing the same across such surface in either direction. When the device is moved in the direction indicated by the arrow in Fig. 4, the blade 6a will serve as the cutter, and the blade 6b will serve as a guide, acting to position the angle of the cutting blade. The peeling 9 from the object 10 will emerge through the slot 7 which is adjacent the cutting blade 6a.

As shown in Fig. 5, the device may be employed to remove the peeling from a curved or irregularly shaped surface, with substantially equivalent performance to that obtained on a straight surface. For example, assuming such an object as a potato 11 is being peeled, any bumps or protuberances such as at 12 will be allowed to extend upwardly into the recess 8, after the manner shown, wherefore the alinement provided by the laterally spaced blades 6a and 6b will not be disturbed.

It is necessary for the user merely to guide the cutter over the undulating surface, and a substantially even-thickness peeling will be secured. In this peeling movement of the cutter, the blades 6a and 6b are merely held against the surface to be peeled, and the device allowed to follow the contour of the object. The handle member 1 is made of relatively small diameter and is preferably of circular cross-section, whereby the device may be allowed to rotate between the fingers in following the contour of the object, the small diameter of the handle member facilitating free digital rotation of the device during the manual movement of the cutter over the surface of the object. This principle of operation is materially distinguished from that employed with heretofore-described peelers, and results in a material decrease in the amount of manual effort required on the part of the user. The device may be pulled toward the user, or pushed away, used either in the left or right hand, with equivalent results. The blades 6a and 6b may be sharpened by placing the blades 6a and 6b flat upon an abrasive surface, such as a "carborundum" stone, and moving the same over such surface, and the two blades will be sharpened simultaneously, and at the correct angle.

The outer end of the cutter element 3 may be provided with a semi-circular cutting blade 13, if desired, which may be employed to remove potato "eyes", worm marks, or the like, the blade 13 being preferably sharpened at both the inner and outer cutting peripheries, as at 14 and 15, so that it may be used in either direction.

In addition, or auxiliary to the cutting blades 6a and 6b, I preferably provide a second pair of opposed cutting blades 16a and 16b, formed in the crown of the body portion 4, and as shown in Fig. 6, these cutting blades are employed in substantially the same manner as are the blades 6a and 6b. When the device is moved in the direction of the arrow in Fig. 6, the blade 16b will be in the role of the cutting element, and the blade 16a will serve as the guiding element. The blades 16a and 16b lend themselves to the above-described sharpening procedure in the same manner as blades 6a and 6b, as will be apparent, and may be alternatively used in the two directions of motion of the device in the cutting operation. In view of the relatively close separation of the blades 16a and 16b, the resulting peeling will be materially thinner than the peeling resulting from the action of the blades 6a and 6b.

The outer edges of the flange portions 5 of the device may be made relatively blunt, and are preferably curved away from the plane of the blades 6a and 6b, wherefore the device may be brought against the user's thumb without damage. The extreme outer edge of the flanges may be turned back and provided with a slightly sharpened edge, as at 17, if desired, and employed as a scraper, for the removal of thin peeling such as are found on new potatoes, carrots, and the like.

Other modifications of the device will occur to those skilled in the art, and for this reason I do not choose to be limited to the specific structure herein delineated and described, but rather to the scope of the subjoined claim.

I claim:

A culinary device which comprises: an elongated channel-shaped body portion provided with outwardly extending flange portions along the longitudinal edges thereof, said flange portions being spaced from said body portion to provide two oppositely disposed longitudinally extending slots; two opposing blade elements formed respectively along the inward edge of each of said flange portions and defining one edge of each of said slots, and an elongated handle member secured to said body portion at one end thereof and extending longitudinally therefrom.

JOHN A. WALLER.